(12) United States Patent
Holmquist

(10) Patent No.: US 6,704,324 B1
(45) Date of Patent: Mar. 9, 2004

(54) APPARATUS AND METHOD FOR TRANSMISSION OF VOICE BAND SIGNALS OVER A DSL LINE

(75) Inventor: Kurt Holmquist, Largo, FL (US)

(73) Assignee: Paradyne Corporation, Largo, FL (US)

( * ) Notice: Subject to any disclaimer, the term of this patent is extended or adjusted under 35 U.S.C. 154(b) by 0 days.

(21) Appl. No.: 09/276,013

(22) Filed: Mar. 25, 1999

Related U.S. Application Data

(60) Provisional application No. 60/079,299, filed on Mar. 25, 1998.

(51) Int. Cl.[7] .................................................. H04J 3/22
(52) U.S. Cl. ..................... 370/465; 370/494; 379/9.06
(58) Field of Search ................................. 370/354, 465, 370/494, 352, 353, 355, 356, 493, 495, 359, 395.52, 463, 467, 496, 540, 533; 379/9.06, 27, 12, 24; 375/222, 224, 225, 228

(56) References Cited

U.S. PATENT DOCUMENTS

| | | | |
|---|---|---|---|
| 5,081,647 A | 1/1992 | Bremer | |
| 5,436,930 A | 7/1995 | Bremer et al. | 375/295 |
| 5,448,555 A | 9/1995 | Bremer et al. | |
| 5,475,713 A | 12/1995 | Bremer et al. | 375/261 |
| 5,521,942 A | 5/1996 | Betts et al. | 375/295 |
| 5,559,791 A | 9/1996 | Bremer et al. | |
| 5,642,379 A | 6/1997 | Bremer | 375/216 |
| 5,661,718 A | 8/1997 | Bremer et al. | |
| 5,684,834 A | 11/1997 | Betts et al. | 375/298 |
| 6,014,425 A * | 1/2000 | Bingel et al. | 379/27 |
| 6,031,897 A * | 2/2000 | Bremer | 379/106.08 |
| 6,061,392 A * | 5/2000 | Bremer et al. | 375/222 |
| 6,069,899 A * | 5/2000 | Foley | 370/494 |
| 6,154,524 A * | 11/2000 | Bremer | 379/27 |
| 6,307,923 B1 * | 10/2001 | Bremer | 379/106.08 |
| 6,470,046 B1 * | 10/2002 | Scott | 375/222 |

* cited by examiner

*Primary Examiner*—Chi Pham
*Assistant Examiner*—Alexander O. Boakye
(74) *Attorney, Agent, or Firm*—Thomas, Kayden, Horstemeyer & Risley, L.L.P.

(57) ABSTRACT

Apparatus and method for providing simultaneously multiple telephone-type services to any/all POTS-type devices on a single wire pair at a user premises. The present invention provides for the ability to add separately addressable POTS devices on a single service loop.

30 Claims, 11 Drawing Sheets

APPARATUS AND METHOD FOR TRANSMISSION OF VOICE BAND SIGNALS OVER A DSL LINE

CROSS-REFERENCE TO RELATED APPLICATIONS

This application claims the benefit of U.S. Provisional Patent Application Ser. No. 60/079,299, filed on Mar. 25, 1998, and entitled "Technique for Transmission of Voice Band Signals Over a DSL Line," which is incorporated by reference herein in its entirety.

BACKGROUND OF THE INVENTION

Field of the Invention

The present invention generally relates to an apparatus and method for enabling a plurality telephone services that can be utilized simultaneously on a single telephone line.

DESCRIPTION OF THE RELATED ART

Presently, telephone companies can offer only one set of services to any and all POTS-type devices on each wire pair at the premise, because current POTS service requires one (1) line per service. This is because device types are mutually exclusive, and consequently only one device type can utilize the service line at any one time. A further limitation exists for the telephones, such that all extensions are connected to the same conversation. Presently, if multiple services are desired, an additional line is required for each additional service. This is most evident in situations such as a second loop for a fax machine or a "teen line" to separate parent telephone calls from those of children in a household. There are added costs for each additional line.

Also, telephone companies today cannot command any additional service revenue from the usage of extra phones, modems, and fax operations on a single line. Until now, telephone companies could not offer any extra beneficial service to the premise. Accordingly, there is a need to develop an apparatus and method to transmit a plurality of data signals in parallel with multiple analog plain old telephone services (POTS) signals, thereby providing multiple plain old telephone type services on a single telephone line.

With such an apparatus and method for enabling simultaneous multiple telephone-type services on a single telephone line, the telephone companies can offer numerous sets of services to any and/or all POTS-type devices on each wire pair at the premise.

SUMMARY OF THE INVENTION

To achieve the advantages and novel features, the present invention is generally directed to a data communications apparatus and method that allows an user to utilize, simultaneously, multiple telephone-type services to any and/or all POTS-type devices on each wire pair at the premise. The present invention provides the ability to add separately addressable POTS devices on a single service loop. This can be accomplished in a multitude of ways: first, by the use of a multipoint protocol, or second, by frequency division multiplexing (FDM), or third, by using time division multiplexing (TDM).

One embodiment of the present invention accomplishes this by using a multipoint protocol and providing each device with a unique device ID that is separately addressable.

Another embodiment of the present invention accomplishes this by using the frequency division multiplexing (FDM) method, which utilizes a device that assigns an available frequency range, within the bandwidth of the communication medium, for each device that is separately addressable.

Further, another embodiment of the present invention accomplishes this by using a time division multiplexing (TDM) method. This method utilizes a form of multiplexing in which transmission time is broken into segments, wherein each segment carries one element of one signal for each device that is separately addressable.

The modem apparatus used in this embodiment includes a memory containing a plurality of program routine sequences and a processor that performs the selected program routine sequences to enable simultaneous multiple access techniques. Suitable modems for this purpose include the modem described in commonly assigned and co-pending U.S. Patent Application entitled "APPARATUS AND METHOD FOR COMMUNICATING VOICE AND DATA BETWEEN A CUSTOMER PREMISES AND A CENTRAL OFFICE", Ser. No. 08/962,796 now U.S. Pat. No. 6,061,392, filed on, Nov. 3, 1997 herein incorporated by reference, and the modem described in commonly assigned and co-pending U.S. Patent Application entitled "APPARATUS AND METHOD FOR A MULTIPOINT DSL MODEM", Ser. No. 09/031,226 filed on, Feb. 26, 1998, herein incorporated by reference.

Furthermore, the modem apparatus used in this embodiment utilizes a technique that encodes analog signals continuously utilizing variable level quadrature modulation to produce two independent analog signals for transmission over an analog communication channel such as a telephone line. This is based on a variation of the technique originally described in a commonly assigned U.S. Pat. No. 5,081,647, entitled "Communication of a Voice Signal Via Continuous Quadrature Amplitude Modulator," herein incorporated by reference.

BRIEF DESCRIPTION OF THE DRAWINGS

The accompanying drawings incorporated in and forming a part of the specification illustrate several aspects of the present invention, and together with the description, serve to explain the principles of the invention. In the drawings:

FIG. 10A shows the usage of line capacity using the analog method of the present invention versus the digital method of voice transmission for a total line capacity of 768 kbps per second with a symbol rate of 64 kHz and 12 bits per symbol.

FIG. 10B shows the usage of line capacity using the analog method of the present invention versus the digital method of voice transmission for a total line capacity of 512 kbps per second with a symbol rate of 64 kHz and 8 bits per symbol.

FIG. 10C shows the usage of line capacity using the analog method of the present invention versus the digital method of voice transmission for a total line capacity of 384 kbps per second with a symbol rate of 64 kHz and 6 bits per symbol.

Figure 1:
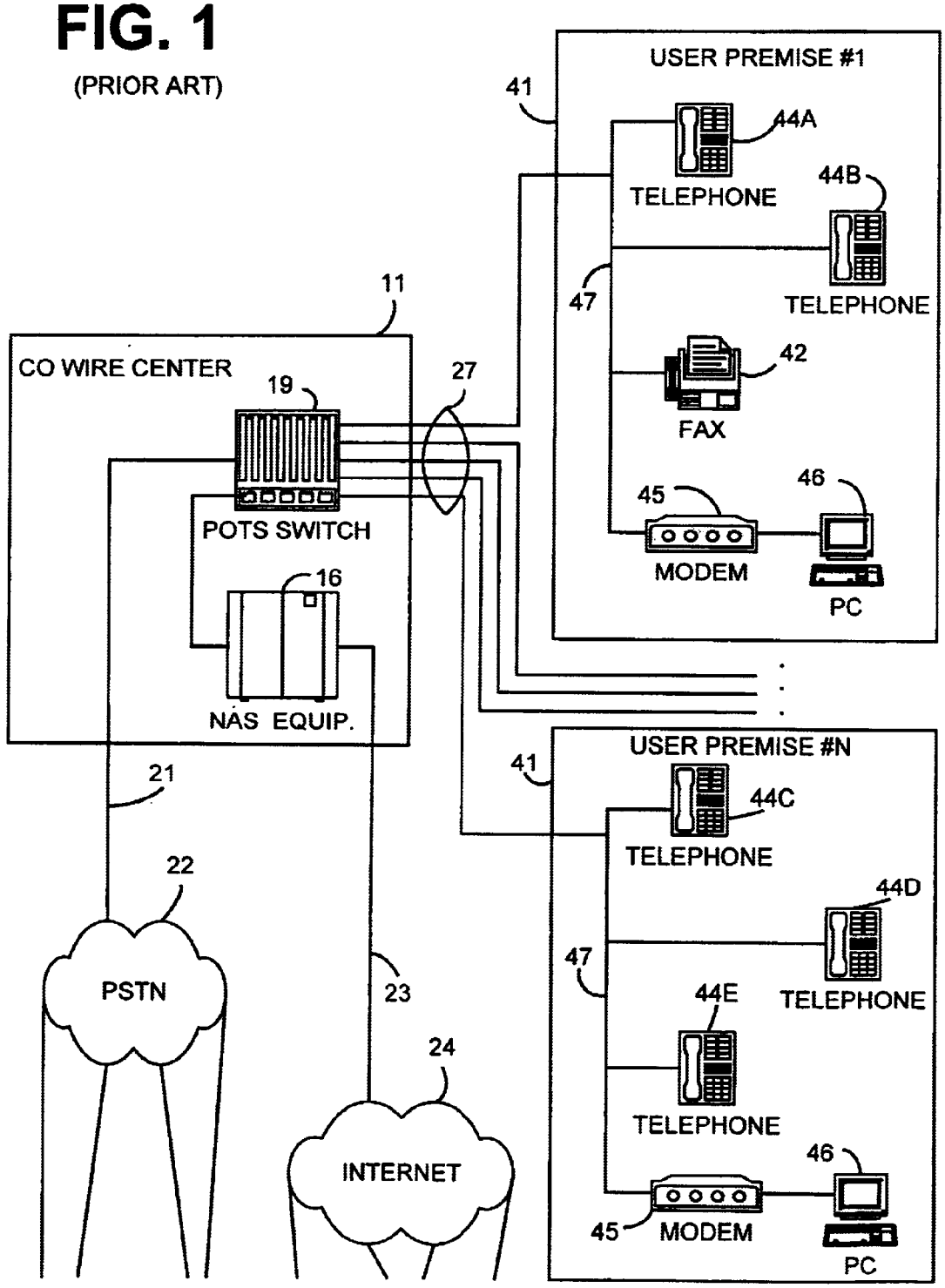
FIG. 1 is a view of the central office (CO) wire centers and user premises layout of the prior art.

Reference will now be made in detail to the description of the invention as illustrated in the drawings. While the invention will be described in connection with these drawings, there is no intent to limit it to the embodiment or embodiments disclosed therein. On the contrary, the intent is to cover all alternatives, modifications, and equivalents included within the spirit and scope of the invention as defined by the appended claims.

DETAILED DESCRIPTION OF THE PREFERRED EMBODIMENT

Referring now in detail to the drawings in which the reference numerals indicate like parts throughout several views.

FIG. 1 illustrates the plain old telephone system (POTS) networks including data communication modems 45 of the prior art.

The POTS network includes numerous user premises 41, wherein each user premises is connected to a central office wire center 11, via a subscriber line 27. Each subscriber line 27 is connected to the user premises 41, which further connects to a user premises line 47, for distribution of POTS service throughout the user premises. Usually, there are numerous POTS devices connected to each user premises line 47, such as telephones 44, fax machines 42, personal computers (PCs) 46, and the like. It is also known, (but not shown), that it is possible to have multiple subscriber lines 27 connected to each user premises, thereby creating two separate user premises lines 47 within each user premises.

As noted previously, each user;premises is connected, via a subscriber line 27, to a central office wire center 11. The subscriber line 27 is connected to a POTS switch 19 that separates the analog POTS signals from data signals. The POTS signals are sent from the POTS switch 19 to the other central office wire centers, via the public switch telephone network (PSTN) 22. Modem data signals can be separated from the POTS analog signals at POTS switch 19, and are connected to network equipment 16, for connection with digital data networks such as, for example, the Internet 24.

A brief discussion of an example of the signals generated in the applied system environment of the prior art from the user premises and transmitted through the central office wire center, via either the PSTN or Internet networks, and back to a user premises, will now be detailed.

When a user wishes to place a telephone call on device 44A, for example, the user picks up the receiver and puts the subscriber line 27 in an off-hook condition that is detected at the central office wire center 11, by closed switch hooks (not shown). The off-hook condition signals the central office wire center 11, via subscriber line 27, to accept an outgoing call by allowing a flow of D.C. current and a dial tone of 480 Hz to be sent to device 44A. The outgoing telephone call signals are transmitted, as described previously, via subscriber line 27 to POTS switch 19. The analog POTS system signals are separated from the modem signals, and the POTS signals are transmitted, via the PSTN 22, to the destination central office wire center 11 of the destination user premises 41. The analog signal is further directed towards a POTS switch 19 within the destination central office wire center 11. The signal is transmitted, via subscriber line 27, to the destination user premises 41. The analog signal enters the destination user premises 41, via subscriber line 27, and is connected to the user premises line 47 that distributes the signal to be received throughout the destination user premises 41. This is the path in which a POTS call is transmitted.

Now, a description of digital signals to/from the user premises will be described. When a user desires to transmit digital data over a network via his personal PC 46 or the like, the digital signals from the digital device are transformed into analog signals, via multiplexing by modem 45. The signals are transmitted over the user premises line 47 to the subscriber line 27 for final delivery to the local central office wire center 11. The digitally multiplexed analog signals going into POTS switch 19, can be separated from the analog voice POTS signals, and directed to network equipment 16, for further transmission of the data signals over the Internet 24, or they can be transmitted to the destination CO wire center 11 over the PSTN 22. The digital data signals sent via the Internet 24 are received at the destination central office wire center 11 by the network access service equipment 16. The signals are transmitted to the POTS switch 19 and over destination subscriber line 27 to the destination user premises 41. The multiplexed signals are received at the user premises line 47, for distribution to all equipment connected to the user premises distribution line. The multiplexed signals are demultiplexed, within the destination modem 45, and converted back into digital signals, which are transmitted to the digital device 46 connected to the modem.

Figure 2:
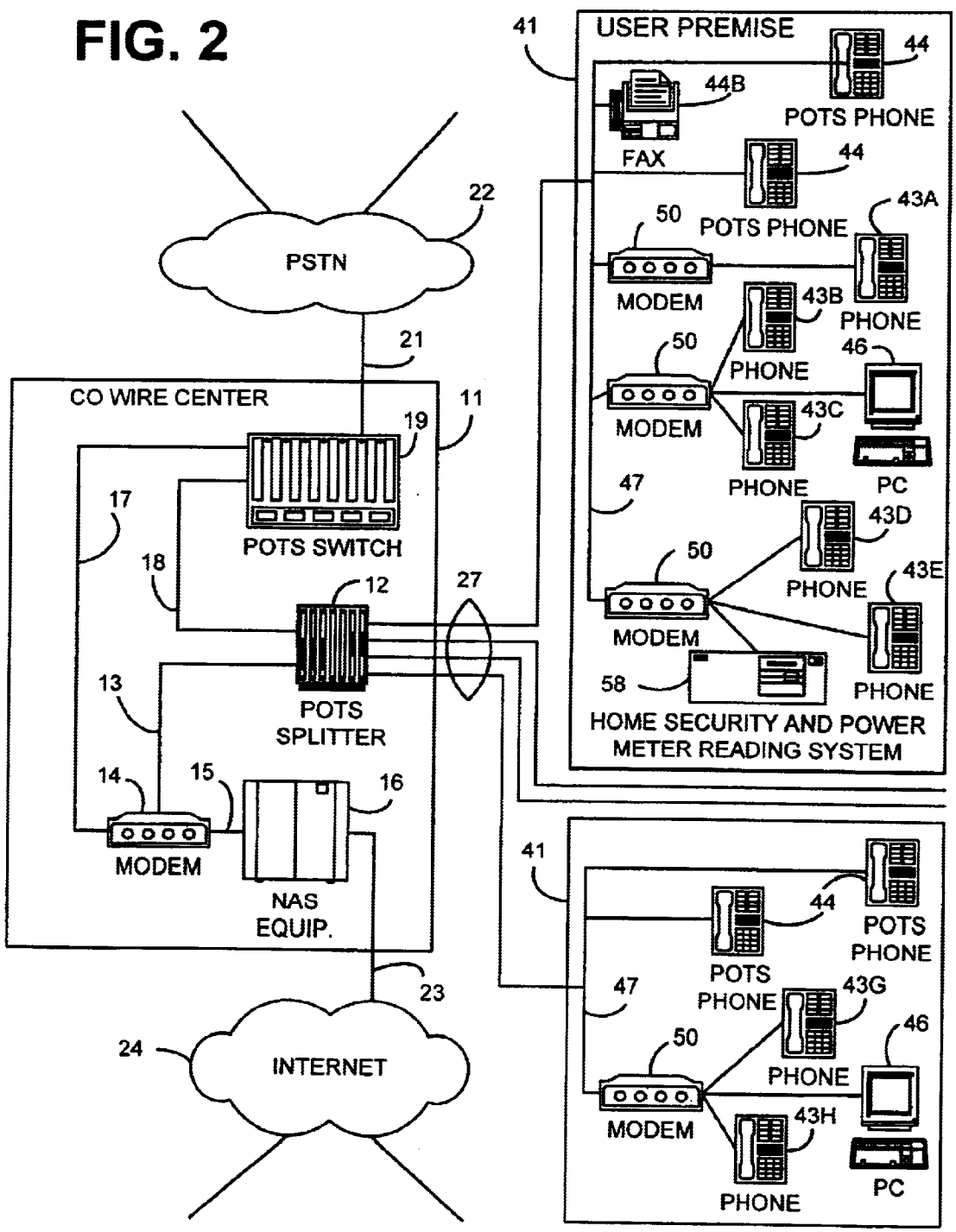
FIG. 2 is a view of the CO wire centers and user premises layout of the present invention, with many of the multiple telephone-type services depicted.

FIG. 2 illustrates the plain old telephone system (POTS) networks including data communication modems (14 and 50) of the preferred embodiment. The data communication modems include the aforementioned apparatus and methods for enabling the simultaneous multiple telephone type services on a single line. FIG. 2 illustrates that a variety of services may be connected at the CO wire center 11 in accordance with the present invention. These services may include those requiring digital communications such as Internet access or home management and security services and those requiring analog communications such as voice communication or any service that normally communicates via a standard POTS connection. Again, the operation of such services are generally understood and a further discussion of them is not necessary in order to describe the operation of the present invention. As further illustrated in FIG. 2, the POTS voice devices, telephone. 44 and standard fax machine 42, establish communications on the frequency band between 0 kHz and about 4 kHz.

A second transmission frequency band is defined at a higher frequency level than the POTS frequency band and is used in the transmission of digital subscriber line (DSL) communications that provides multiple access techniques of the preferred embodiment. The DSL modems 50 provide both the physical layer and higher layer functions needed to provide the simultaneous multiple access.

Other methods of providing multiple access, such as frequency division multiplexing or other multiplexing techniques, may be utilized but may result in some degradation in overall performance. The different equipment devices at the user premises can be identified and accessed by a multiple access code (MAC) address as determined by the modem 50, or by the assigned available frequency range within the bandwidth of the communication. Now the different types of services will be described with regard to FIG. 2.

Derived POTS phone 43A is an ordinary POTS phone that is connected to modem 50 instead of directly to subscriber line 47 as in the case of normal POTS service. Modem 50 encodes the analog signal received from phone 43A as necessary and transmits the encoded audio at an average data rate of 8 kbps and performs a reverse function in the received direction. This transmission uses a frequency band outside of the normal POTS frequency band of 0 kHz to 4 kHz and does not interfere with normal POTS services utilized by standard POTS devices, such as facsimile machine 44B and POTS phones 44A that are connected directly to subscriber line 27. Thus, the Derived POTS phone 43A acts to the user as a separate telephone line that may also communicate over the PSTN network.

The PC 46 may transmit and receive data via modem 50 from the Internet or from a local area network (LAN) or other point-to-point type of data transmissions network.

The home security and power meter reading system device 58 provides monitoring and controlling of various home functions such as a security system. It also provides the ability for communicating home functions data to a local utility such as gas usage, electricity usage, water usage, and the like.

All the unique service devices connected to modems 50, as shown and described with regard to FIG. 2, can be accessed via unique addresses. For each particular Telco service provided, that service provides the user an unique address or frequency range for each new service premise device. Thus, those and only those unique service devices are enabled.

Each of the additional service devices illustrated in FIG. 2 are connected to the user premise line 47. This user premise line is further connected to one subscriber loop 27 that connects to the CO wire center 11. The signals from each of the service devices are modulated via modem 50 and input to the CO wire center plain old telephone system ("POTS") splitter 12 which separates the POTS communications that are now transmitted in the frequency band between 0 kHz and 4 kHz. These POTS signals are identified in POTS splitter 12 and separated from the multiple service signals operating at a higher frequency at POTS splitter 12. The POTS voice signals are separated from the data signals and transmitted to POTS switch 19 for communications over the PSTN 22 or other networks (not shown). The data signals and Internet data signals are separated from the voice POTS signals in POTS splitter 12 and forwarded on the master modem 14. Master modem 14 uses one of the aforementioned multiplexing techniques to separate the representations of the signals of the derived POTS devices from those for the digital devices. The derived POTS signals are forwarded to POTS switch 19 on communication line 17 where they appear as signals no different from those normally received via standard POTS lines. Master modem also forwards the digital signals from the digital devices at customer premises 41 on communication line 15 for further transmission through the NAS equipment devices 16 to the Internet 24 and other LAN networks on communication line 23.

The Derived POTS phones 43 each may have a standard telephone number or may share a number with the other devices. The Derived POTS phone 43 would have standard. Telco POTS features and billing. The Derived POTS phone 43 operation is enabled by the modem apparatus of the present invention herein described with regard to FIG. 3B through FIG. 12.

Figure 3A:
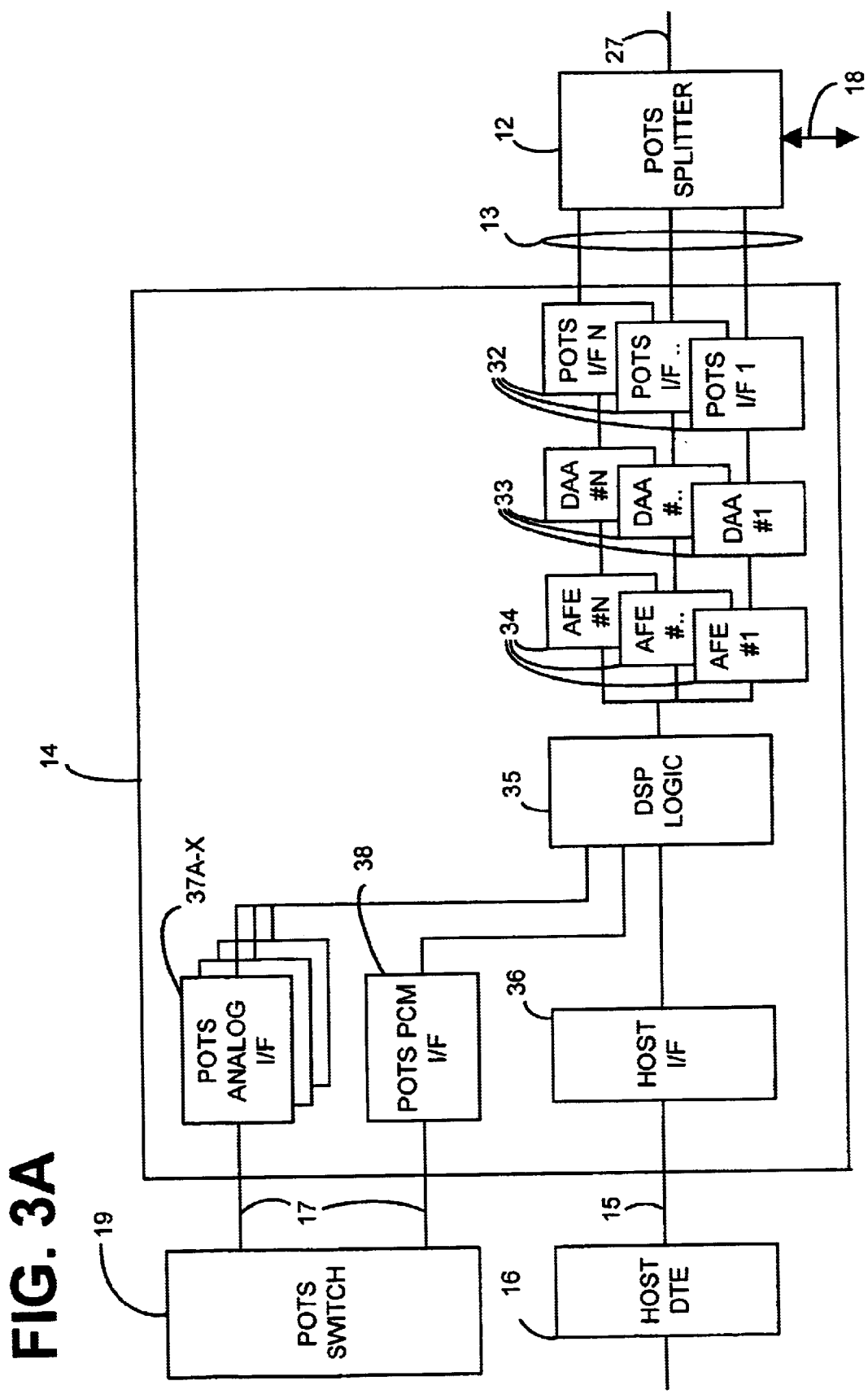
FIG. 3A is a block diagram of the CO POTS interface and modem apparatuses of FIG. 2.

FIG. 3A is a block diagram of the CO wire center multichannel data 20 communications device modem (modem 14) constructed in accordance with the present invention. The typical configuration of the central wire office 11 multichannel data communication device 14 is connected, via a POTS splitter 12, to the subscriber line 27. The analog signals output from POTS splitter 12 into the central office multichannel data communications device 14, are connected through communication links into the POTS interface 13. The central office multichannel data communications device 14 provides for multiple analog lines to be input and converted to digital signals, due to the efficiency of the processor 35 within the central office multichannel data communication device 14. Because multiple analog input lines are permitted, device 14 may require multiples of the analog POTS interface hardware 32, dial access arrangement (DAA) logic 33 and analog front end (AFE) logic 34.

The analog POTS interface hardware 32 connects analog signal line to the dial access arrangement (DAA) logic 33. The dial access arrangement (DAA) logic 33 provides surge protection and impedance matching. A line protection circuit (not shown) protects the multichannel communications device 14 against line surges, lightning strikes, and the like. The line protection circuit is then further connected to an impedance and isolation circuit (not shown), via a communication link. The Impedance and Isolation circuit also contains circuitry to detect Ring Indicator and Off-hook conditions.

The impedance and isolation circuit is comprised of an impedance matching circuit (not shown) before being connected to the two-to-four wire hybrid interface (not shown). The dial access arrangement (DAA) logic 33 connects the analog signals to the analog front end (AFE) logic 34, via a communication link.

The analog front end (AFE) logic 34 converts the analog signal to a digital data signal. The AFE 34 is connected to a communication link which is connected to a receiver (not shown). The receiver receives the analog signals and converts the analog signal by using an analog-to-digital converter (not shown). A driver (not shown) drives the signals across a communication link to the impedance and isolation circuit (not shown) of DAA 33, after receiving signals from the driver's digital-to-analog converter (not shown). The receiver analog-to-digital converter and driver digital-to-analog converter are both connected to the bidirectional digital communication link. Ring indicator and off-hook conditions are processed in a Ring Indicator (RI) Off-Hook (OH) Impedance Controller (not shown).

The AFE logic 34 transmits the digital signal to the DSP logic 35 for reconstruction of the digital data. Multiple analog front end logic components 34 may be connected to a single DSP, CPU, ASIC or other processor logic 35, due to the high processing speed of such processor logic.

In alternative embodiments of the invention, the multiple dial access arrangements (DAA) logic components 33 and analog front end logic components 34 are not necessary to practice the present invention, and may be omitted in some applications where the dial access arrangement (DAA) logic 33 and analog front end logic 34 are shared between numerous analog POTS interface hardware 32, as will be understood by those skilled in the art. DSP logic 35 reconstructs the digital signal streams into usable digital data by stripping error control information, data compression and the like added by the far-end modem. The reconstructed digital data is transmitted from the DSP logic 35 through the host interface 36 to the host DTE 16 devices for further transmission over the Internet 24, or other like digital networks. DSP logic 35 also reconstructs the samples of the analog signals received at customer premises 41 from POTS devices 43 that are connected to modems 50. These signals are then forwarded to POTS switch 19 via either multiple POTS analog interfaces 37A-X or POTS pulse code modulation (PCM) interface 38.

Analog interfaces 37A-X transmit analog signals in the frequency band from 0–4 kHz that are identical to those normally transmitted by a standard POTS device connected directly to subscriber line 47. POTS PCM interface 38 transmits standard $\mu$-Law or A-Law digital representations of multiple analog channels as a multiplexed stream of 8-bit samples using standard formats such as that prescribed by prescribed by Bell Communications Research; (Bellcore) Generic Requirements GR-303-CORE "Integrated Digital Loop Carrier System Generic Requirements, Objectives, and Interface". In either case, POTS switch 19 receives these signals in a form that is no different from standard POTS circuitry and provides a separate and independent access to the PSTN 22 from each derived POTS device at customer premises 41. Likewise, DSP logic 35 receives digital data from host digital device 16 via connection 15 and host interface 36. It also receives signals representing analog POTS channels from POTS switch 19 via connections 17 and either POTS analog interfaces 37A-X or POTS PCM interface 38. Analog interfaces 37A-X receive analog signals in the frequency band from 0–4 kHz that are identical to those normally transmitted by POTS switch 19 via a direct connection to a standard subscriber line. POTS PCM interface 38 receives standard $\mu$-Law or A-Law digital representations of multiple analog channels as a multiplexed stream of 8-bit samples using standard formats such as that prescribed by Bell Communications Research (Bellcore) Generic Requirements GR-303-CORE "Integrated Digital Loop Carrier System Generic Requirements, Objectives, and Interface". In either case POTS switch 19 provides a separate and independent access from the PSTN to each derived POTS device at customer premises 41.

Figure 3B:
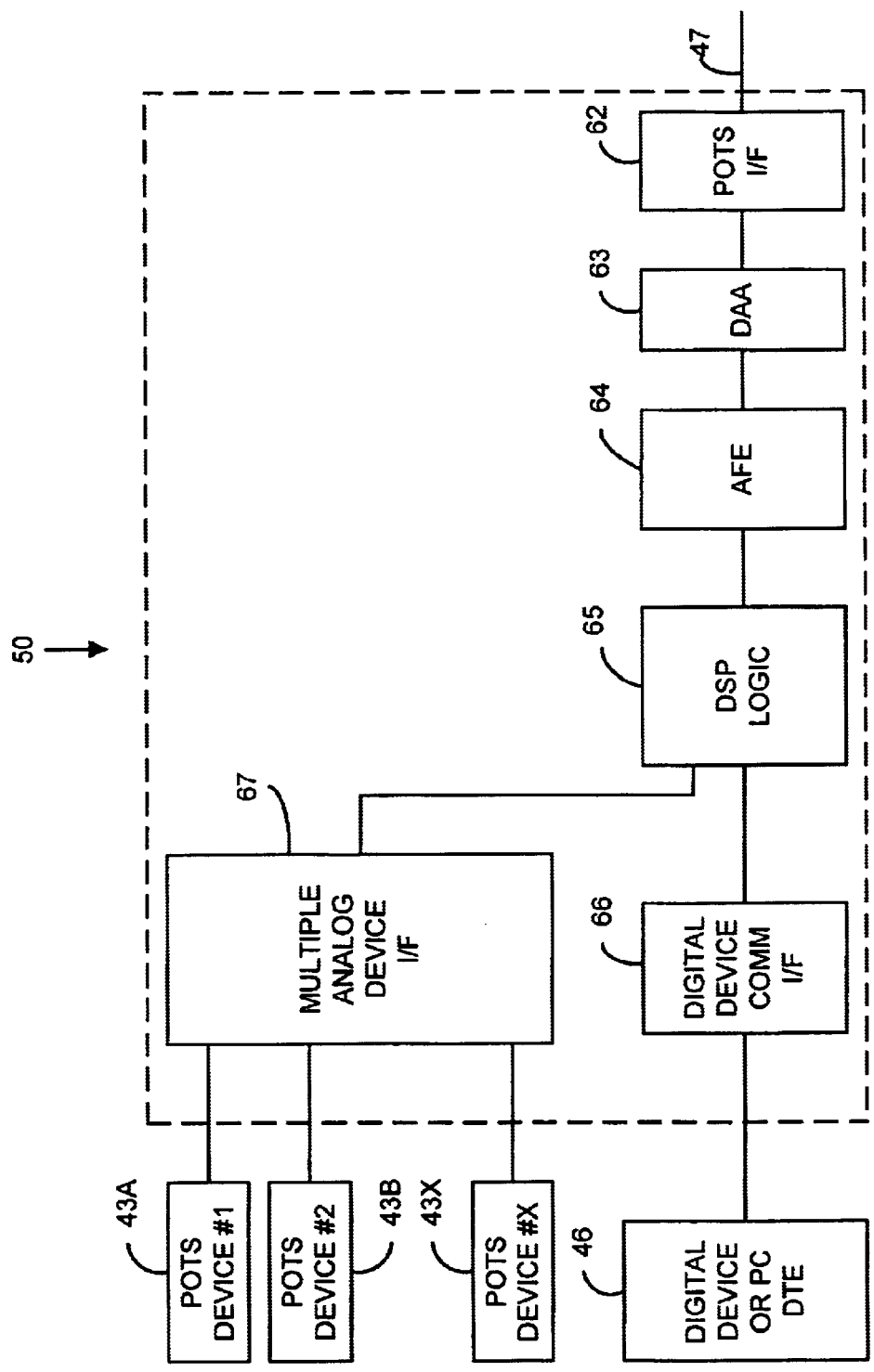
FIG. 3B is a block diagram of the user premises POTS interface and modem apparatuses of FIG. 2.

FIG. 3B is a block diagram of the single POTS line multichannel data communication device (modem 50) constructed in accordance with the present invention. The multichannel data communication device (modem 50), is substantially similar to the CO wire center multichannel data communication device 13, defined in FIG. 3A., except that device 50 is configured to accept multiple POTS device connections in addition to one or more digital device connection.

In the typical configuration, the user premises line 47 is connected to POTS line interface 62. The POTS line interface 62 is connected to Dial Access Arrangement interface 63, Analog Front End 64, digital signal processor logic 65, and the device communications interface 66, as described in 3A above as items 3X. The digital signal processor logic 65 is connected to the host digital device or data terminal equipment (DTE), by a digital device communications interface 66 bus via a communication line, which connects to a device such as a digital fax, digital phone, personal computer (PC), or the like. The digital signal processor logic 65 is also connected to the multiple analog device interface 67 via a communication line. The multiple analog device interface allows the communication device 50 to connect multiple analog devices for derived POTS service of the present invention. These analog POTS devices for derived POTS service typically are telephones, however, other devices that normally operate via a direct connection to a subscriber line such as facsimile machines, audio services, power meter reading, home management, security systems and the like are also contemplated by the inventor.

Communications device 50 can be for example but not limited to, a data service unit (DSU), modem, or any other communication device capable of frame relay communication. In the preferred embodiment, communication device 50 is a DSU, which contains proprietary address determination logic. Central office location 11 is typically the local telephone companies' local exchange office which connects via copper wire pair 27 to a remote customer location 41, which can be for example a residential or business location.

Figure 4:
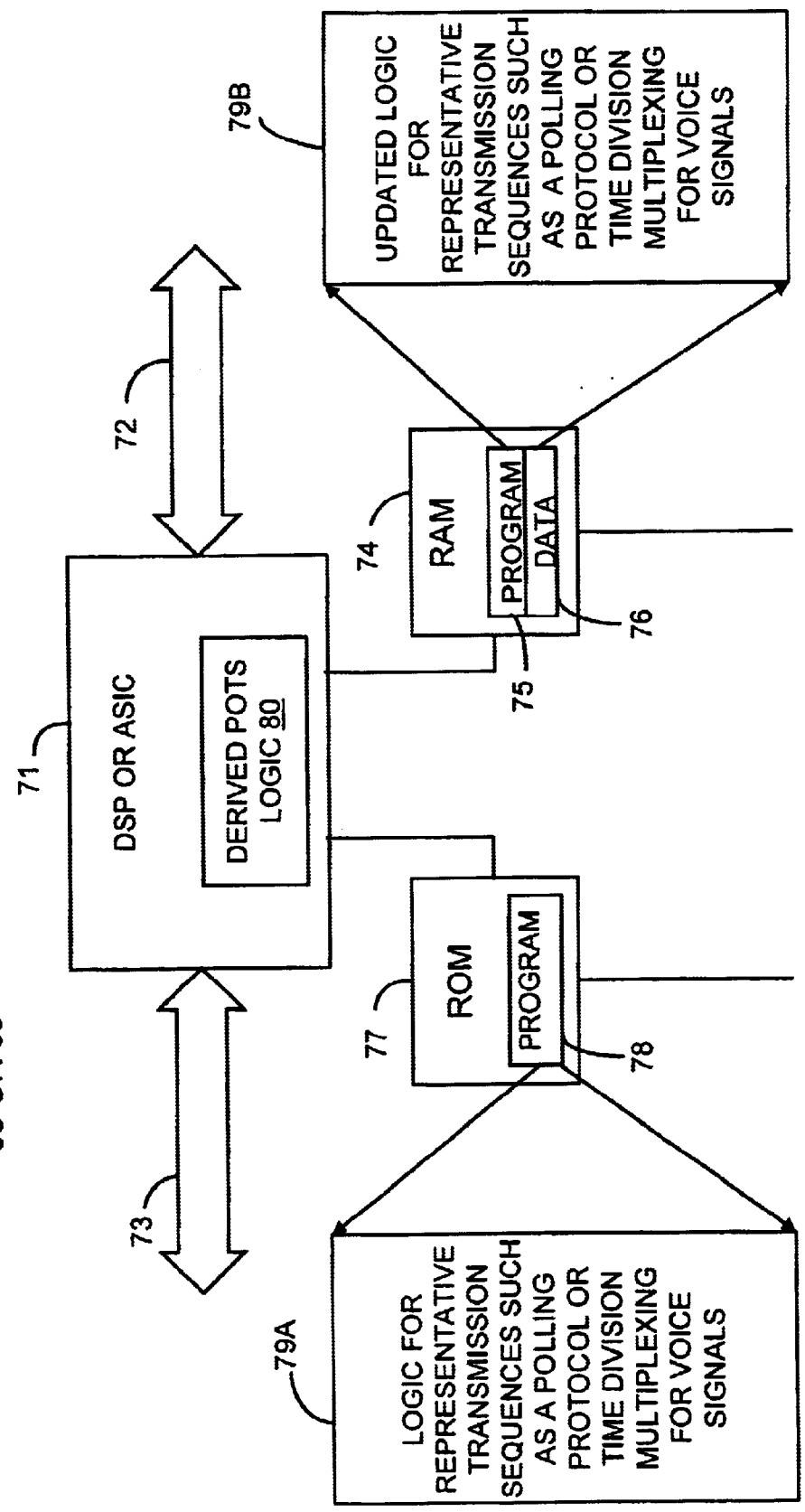
FIG. 4 is a block diagram of the digital signal processor engine of FIGS. 3A and 3B.

As shown in FIG. 4, the digital communication link 72 is connected to the digital signal processor engine (35 or 65, herein referred to as 65), which includes a digital signal processor (DSP) or application specific integrated circuit (ASIC) chip 71, which is connected to read only memory. (ROM) 77 and random access memory (RAM) 74. ROM 77 can be comprised of either regular ROM or RAM memory, flash memories, erasable programmable read only memory (EPROMs), electrically erasable programmable read only memory (EEPROMs), or other suitable program storage memories. RAM memory 74 can be comprised of static or dynamic RAM, EEPROM, or other suitable data storage memories.

The transmission sequence routines for controlling the transmission format (i.e. multipoint protocol, Time division multiplexing and frequency division multiplexing) are normally within the digital signal processor engine (65) program ROM 77. Transmission sequence routines can be downloaded from digital devices, usually a PC connected to the DTE interface 66 (FIG. 3B), into the digital signal processor engine 65 program RAM 74 program area 75.

It is contemplated by the inventor that an updated routine may be downloaded to the modem apparatus to update the address determination routines.

The derived POTS logic 80 of the present invention can be implemented in hardware, software, firmware, or a combination thereof. In the preferred embodiment(s), the derived POTS logic 80 is implemented in software or firmware that is stored in a memory and that is executed by a suitable instruction execution system.

The address determination routines are also in the digital signal processor engine (65) program ROM 77. Address determination routines can likewise be downloaded from digital devices into the digital signal processor engine 65 program RAM 75 program area, so that an updated address determination routines may be downloaded to the modem apparatus.

The incoming signals on digital line 72 are input into the DSP engine 71 for processing. Control signals and digital input/output signals are communicated across digital communication link 73. Digital communication links 72 and 73 can be comprised of 8, 16, 32, 64, 168 or other bit sized digital parallel communication links. Communication links 72 and 73 can also be comprised of bit serial or other types of chip-to-chip signal communication links. The DSP or ASIC 71 of the digital signal processor engine 65 is connected, via communication link 73 interface 36 or 66 as illustrated in FIGS. 3A and 3B.

Figure 5:
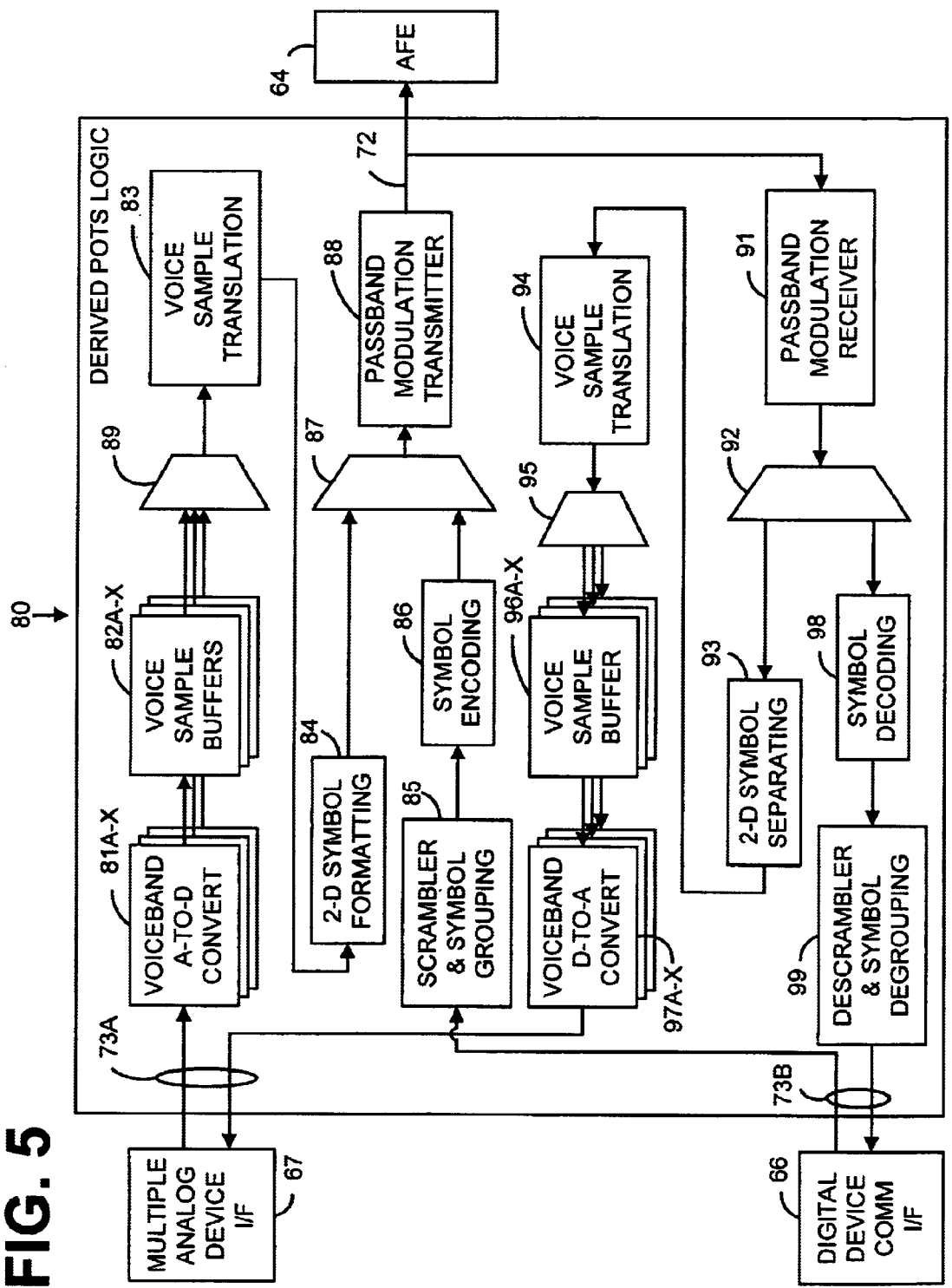
FIG. 5 is a block diagram of the derived POTS circuitry for the digital signal processor of FIG. 4.

Referring to FIG. 5, which is a functional block diagram representative of the derived POTS logic 80, as shown in FIG. 4. As previously noted, the derived POTS logic 80 residing within the DSP or ASICs 71 is connected to the multiple analog device interface 67 and the digital device communication interface 66. Outgoing derived POTS signals are received by the data communication device 50 by the multiple analog interface 67 as described above. The analog signal is transmitted via bus 73A to the voice band analog-to-digital converter logic 81.

The voice band analog-to-digital converters convert each analog signal to a digital signal by sampling the analog signal at a sample rate of 8 kHz to a produce a stream of digital samples. This analog-to-digital conversion can be done using either linear conversion, or Mu or A law conversions. It is contemplated by the inventor that multiple voice band analog-to-digital converters 81A-X can be utilized to support any number of analog source signals to be transmitted.

Next, the voice samples for each analog source signal are accumulated in voice sample buffers 82A-X so that a block of samples for each analog source signal is available to be sent over the subscriber line 27 as a burst. The size of the block has a major impact on both the delay experienced by the voice band signal and the efficiency at which the voice signal can be transmitted since there is some fixed amount of overhead associated with each burst. The analog samples are grouped into frames and applied to the modulating signal in bursts at a rate that is much higher than the rate at which the pairs of samples were generated. In order to do this it is of course necessary to collect blocks of samples in the voice sample buffers 82A-X until the point in time arrives at which the pairs of analog samples can be applied to the modulating signal in a burst. Multiplexer 89 selects from one of the buffers of voice samples as the current source for following processing blocks. Typically all analog-to-digital converters 81A-X generate samples of their analog input signals continuously and at the same rate and therefore all produce the same size blocks of samples in the voice sample buffers 82A-X at the same rate. In this case, multiplexer 89 can operate in a simple circular manner in which each voice sample buffer is selected at the input in turn until a complete block has been transmitted. When the contents of the last buffer have been transmitted, the multiplexer returns to the first buffer as the source. More complex schemes to control multiplexer 89 can be readily applied to accommodate cases where the sample rates of the A-to-D converters 81A-X and or the sizes of the voice sample blocks are not the same for all analog input sources 67.

Next, there is an optional voice sampling translation 83 that encodes the voice samples. This may be desirable to use amplitude compression to reduce the dynamic range of a voice signal. This will improve the signal-to-noise ratio over a subscriber line for low level voice signals. Even if the analog-to-digital conversion is done by Mu or A law codec, it may be desirable to use a different compression scheme for transmission over the subscriber line.

A simple form of amplitude compression that can be readily applied at block 83 is to "normalize" the amplitude of a block of samples. It is well known that voice energy varies over a wide range but the energy or sound level tends to be fairly constant over short segments (i.e. the energy level typically changes gradually.) It is also well known that the perception of noise in a voice signal is dependent on the level of the noise relative to the level of the voice signal rather than on the absolute level of the noise itself. At the same time, the energy level that can be transmitted on the line is limited by a number of factors including the capabilities of the circuitry of the analog front end as well as regulatory limits placed on maximum signal strength to limit interference from one subscriber line to another. Therefore, given that some noise will be added to the voice signal as part of the process of transmitting it across the line using the technique of the current invention, the perceived amount of noise in the received signal can be minimized by always transmitting each block of voice samples at the maximum amplitude that can be accommodated by the modulation technique and hardware. This is done by multiplying the level of every sample in a block by a value that converts the amplitude of the maximum amplitude sample in the block to the maximum input level accommodated by the transmitter. In order to accurately reconstruct the voice signal at the receiver, it is also necessary to transmit the scaling factor that is used for each block.

Figure 11A:
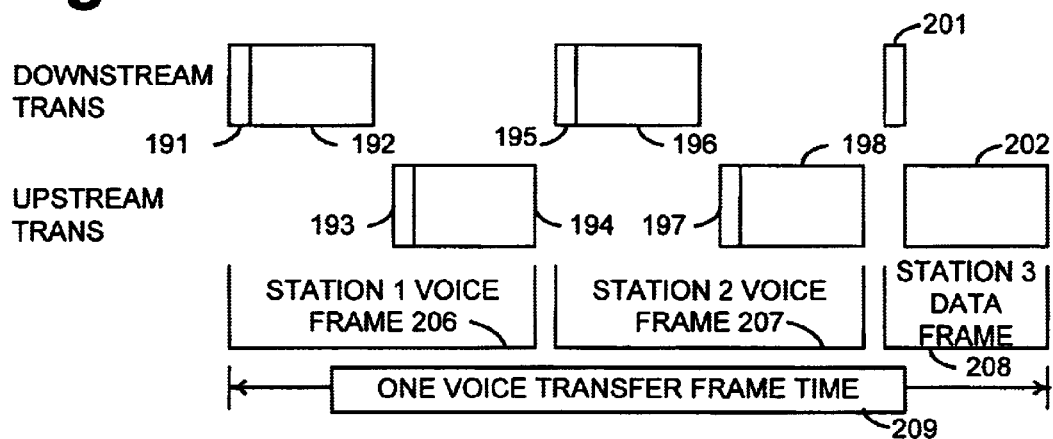
FIG. 11A is a block diagram representative of transmission sequences of the present invention using a polling protocol with two voice channels available and signal activity on both channels.
Figure 12:
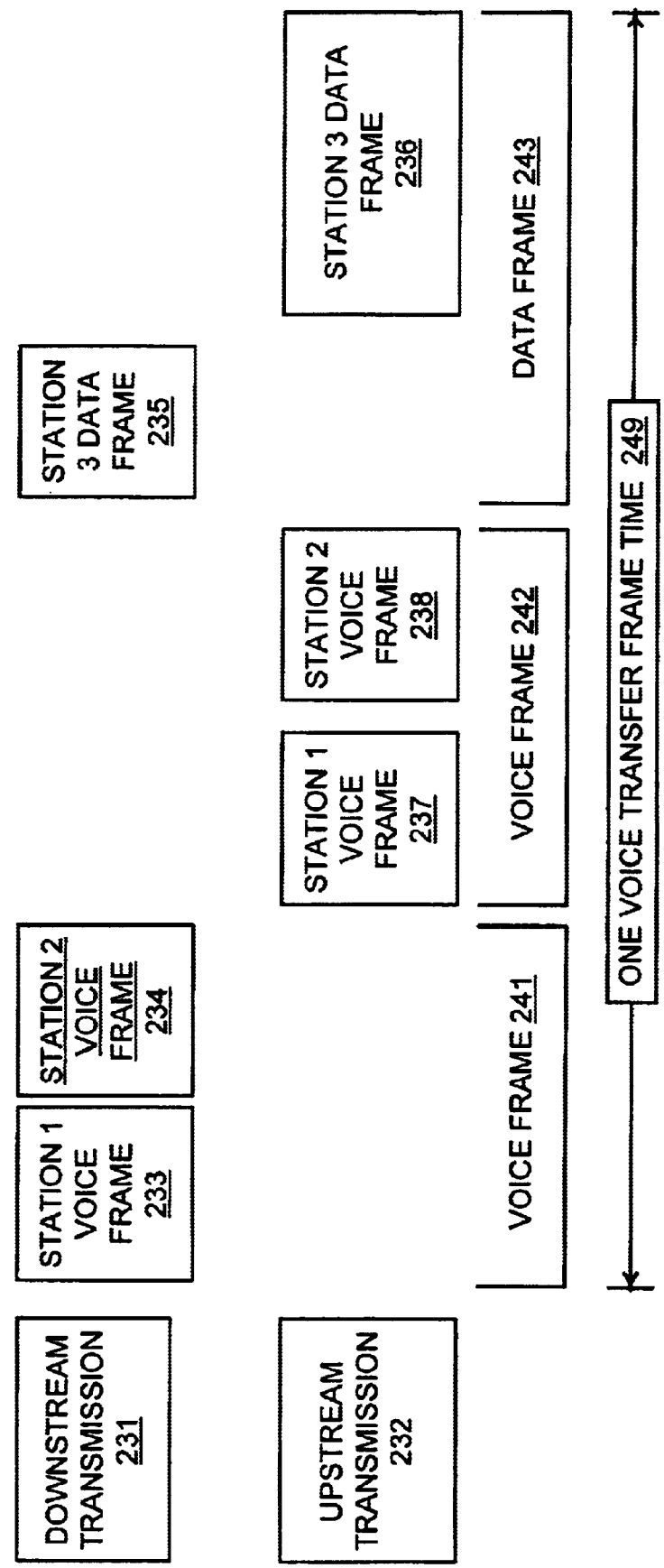
FIG. 12 is a block diagram representative of the transmission sequences using time division multiplexing for voice signals with two voice channels available and both voice channels with signal activity.

The technique used to transmit this scaling factor is variable based on the transmission format used. In the case of sending voice using a polled multipoint protocol as illustrated in FIG. 11A, a short header containing information in digital format precedes each block of voice samples (for example, but not limited to 191,193,195 and 197) and this scaling factor can be included as part of this data. If voice samples are transmitted using time division multiplexing as illustrated in FIG. 12, no header is transmitted. In this case, the block of voice samples can be preceded by one or more symbols whose amplitude represents the block scaling factor and whose phase can vary randomly as necessary to preserve a flat spectral distribution of the transmitted signal. Sending the scaling factor a multiple of times either at the beginning or end of a block of voice samples will help protect against corruption of this scaling factor by noise. (The factor used by the receiver can be determined as the average of the amplitudes of the multiple symbols.)

According to the technique as described in U.S. Pat. No. 5,081,647, issued to Bremer, entitled "Communication of a Voice Signal Via Continuous Quadrature Amplitude Modulation," herein incorporated by reference and discussed previously voice samples are read out of the voice sample buffer 82 two at a time and are combined to make a single two-dimensional (2-D) symbol with in-phase and quadrature components in the 2-D symbol formatting block 84. The amplitude of the symbol along each axis is just a numerical value of the corresponding voice sample of the current pair. Thus, for a block of N voice samples generated at the voice sampling rate (e.g. 8 kHz), N/2 symbols are transmitted at the symbol rate of the passband line modulation in use.

The logic of block 80 allows for a single modem to alternately transmit signal representing one or more voice channels or signals representing a data from a digital device 46 connected to digital device communication interface 66. The serial data stream transmitted by the connected digital device is scrambled and mapped into a stream of two-dimensional symbols in blocks 85 and 86 using the known techniques commonly applied to transmission of digital data using passband modulations.

Multiplexer 87 alternately selects blocks of symbols for transmission comprised of either converted voice samples from the 2-D symbol formatting block 84 or converted digital data from the symbol formatting block 86. The scheme for controlling multiplexer 87 depends on the technique used for managing bandwidth on the subscriber line among multiple signal sources. If the polled-multipoint protocol scheme of FIGS. 11 (A–C) is used to manage use of the line, multiplexer 87 is configured to select the output of voice symbol formatting block 84 when the master station elects to transmit a block of voice data or a tributary station receives a poll from the master station to transmit its voice data. If the time-division multiplexing scheme of FIG. 12 is used to manage use of the line, all voice sources are assigned segments of time within a periodically repeating and constant length time interval. In this case, multiplexer 87 is controlled by logic (not shown) that is clocked at the symbol rate and generates a gating signal that corresponds to the time slots assigned to each transmitted voice channel.

The symbols from both sources (block 86 and 84) are processed by passband transmitter 88 in exactly the same manner. The significant difference is that, while the data symbols have distinct discrete levels corresponding to points in a constellation, the voice symbols can have any value within a contiguous numerical range afforded by the encoded word size. For example, the coordinates of symbols derived from encoded data may occur in increments of 100, 200, 300, up to some maximum, whereas valid voice samples may have values of 182, 247, etc. Blocks of voice samples are transmitted in bursts from the filter transmitter 88 at the symbol rate used by the passband modulation. For the sake of example, following discussions will use the value of 64 kHz as a representative symbol rate. However, it is obvious to one of ordinary skill in the art that this symbol rate could be an arbitrary rate of the apparatus.

The transmission burst for the voice signals contains one block of voice samples for each signal but contains half as many symbols due to the pairing of voice samples. For example, a block of 240 voice samples, representing 30 milliseconds of voice at 8 k samples per second is transmitted as 120 symbols in 120/64 k or about 2 milliseconds (assuming the symbol rate is 64 kHz).

It is contemplated by the inventor that the passband modulation transmitter 88 may use Carrier-less Amplitude-Phase (CAP) Modulation, Quadrature Amplitude Modulation (QAM) or other known modulation capable of transmitting a stream of 2-dimensional samples. CAP, which is a widely known technique for data transmission over a Digital Subscriber Line (DSL) is very similar to QAM. The main distinctions are that CAP omits the multiplication of the in-phase and quadrature components of the transmitted symbol by the cosine and sine of the accumulated carrier phase at the transmitter and receiver and replaces the baseband filters applied to these components in QAM with orthogonal (Hilbert) passband filters. What both modulation techniques have in common is the ability to transmit a stream of 2-dimensional symbols at a rate (in symbols per second) that is approximately equal to the bandwidth (in cycles per second) occupied on the communications medium.

An incoming signal is received by the analog front end and transmitted to a passband modulation receiver block 91 of design as appropriate for the transmitted modulation that recovers the stream of 2-D symbols transmitted from another station.

De-multiplexer 92 alternately delivers blocks of received symbols comprised of converted voice samples to the 2-D symbol separating block 93 or comprised of converted digital data to the symbol decoding block 98. The scheme for controlling de-multiplexer 92 depends on the technique used for managing bandwidth on the subscriber line among multiple signal sources. If the polled-multipoint protocol scheme of FIG. 11 is used to manage use of the line, multiplexer 92 is configured to select the output of voice symbol formatting block 84 when header is received indicating that a block of voice data follows. If the time-division multiplexing scheme of FIG. 12 is used to manage use of the line, de-multiplexer 92 is controlled by logic that is clocked at the symbol rate and generates a gating signal that corresponds to the time slots assigned to each received voice channel.

The multiplexer logic 92 directs a block of symbols to either the digital device connected to the data communication device 50 or an analog device connected to the digital device 50. If the symbol destination is to the digital device 46, the multiplexer 92 forwards the symbol to the symbol decoding block 98 and descramber and symbol degrouping block 99 using the technique appropriate for data transmitted using the widely known techniques commonly applied to transmission of digital data using passband modulations. The digital signal is then transmitted across bus 73B to the digital device communication interface 66 for further transmission to the connected digital device 46, or the like.

If the received signal is a block of voice samples, the multiplexer 92 forwards the signal to the 2-D symbol separating block 93 that converts each single two-dimensional symbol with in-phase and quadrature components into two consecutive voice samples that are forwarded to voice sample translation block 94. This block does the inverse of any voice sample translation done at the transmitter in block 83. In the case of the amplitude normalization scheme described above, block 94 performs the "de-normalization" operation consisting of multiplying each sample by the reciprocal of the scaling factor used at the transmitter and then transmitted with the voice sample block as described above. If some other compression scheme is used at the transmitter, block 91 applies the appropriate decompression process.

Blocks of voice samples processed by voice sample translation block 94 are delivered to de-multiplexer block 95 which selects one of the receiver voice sample buffers 96A-X to hold the block of samples. The de-multiplexer 95 is controlled using an appropriate scheme to match the way in which multiplexer 89 at the transmitter selected blocks of voice samples for transmission. Blocks of voice samples are recovered from the received signal at a rate that is much higher than the continuous rate at which they must be delivered to digital-to-analog converters 97A-X for accurate reproduction of the original analog signal. Voice sample buffers 96A-X are therefore required to match the instantaneous rates of the input and output.

The voice samples are then delivered from the voice sample buffers 96A-X to the voiceband digital-to-analog converters 97A-X which change the samples back into their analog form and transmit the signals to the multiple analog interface device 97 across bus 73A. Under suitable conditions, the data recovered from the blocks of symbols produced from the received digital data stream at interface 66 will be exactly the same as the data initially transmitted from the digital device DTE 46. However, the analog signal recovered from the block of symbols produced from the receive voice sample stream at interface 67 will typically not be exactly the same as that originally transmitted from the POTS device(s) 43A-X. Differences will be caused by noise on the subscriber line 27 and any inability of the Hilbert filter receiver and equalizer 91 to exactly compensate for the linear distortion of the channel.

However, differences of this type, if not too severe are readily accommodated by the human ear and are accepted as characteristic of voice transmitted over normal telephone circuits. In fact, in some cases, because of the correction to frequency amplitude distortions provided by equalization applied in the passband receiver and because of reductions in perceived noise resulting from the translations done to the voice samples in blocks 83 and 94, the quality of the voice signal may actually be improved over what can be obtained on the same subscriber line using only the standard POTS equipment.

Figure 6:
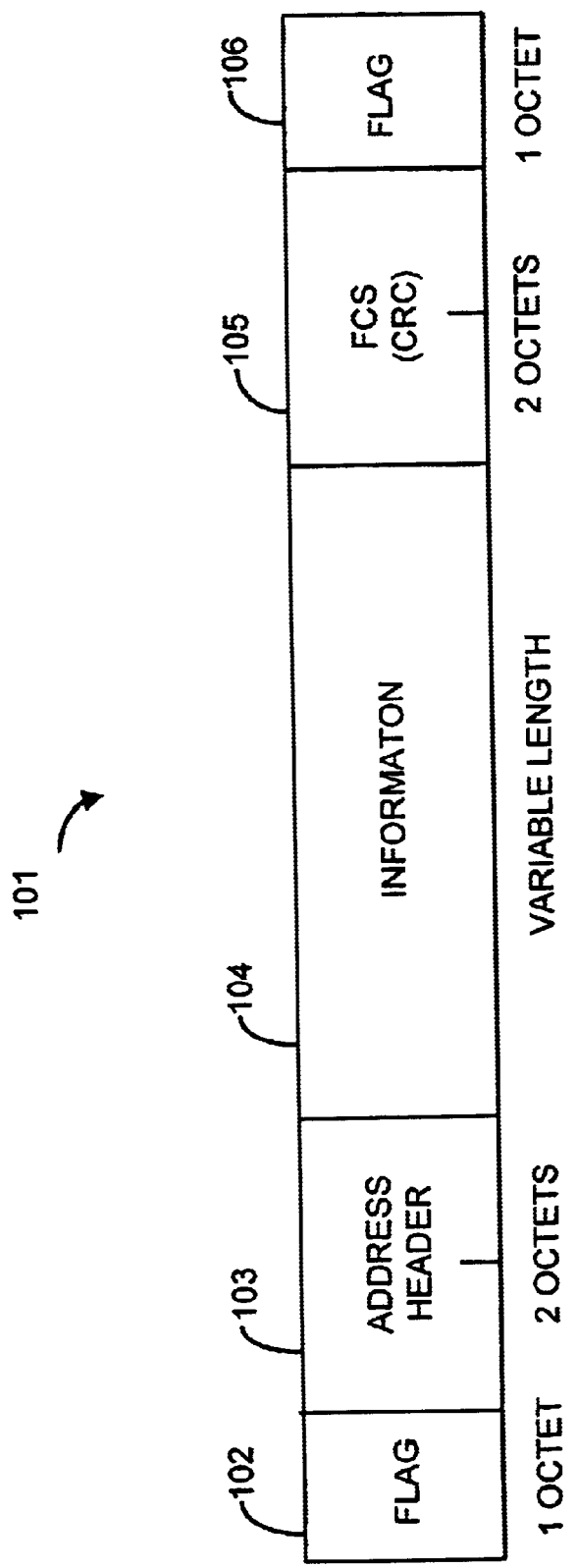
FIG. 6 is a block diagram of the packet using the multipoint protocol that provides allows each device to be separately addressable.

With reference now to FIG. 6, shown is a schematic view illustrating a communications packet 101 that may be transported by the modem 50 of FIG. 3. Packet 101 can be similar in format to a standard frame relay communication packet. It contains a beginning flag 103 followed by a fixed length address and control field to identify both the sender and the intended recipient of the message and possibly the type of message being sent. It also contains a variable length information or payload section followed by a cyclical redundancy check (CRC) error detection code used to ensure the integrity of the transported information. Finally, frame 106 contains the one octet end flag used to signal the end of the packet.

Packets of a format similar to that shown in FIG. 6 are used to transmit data between digital DTE devices across the network. They are also used to control transmission of voice signals when the bandwidth used for voice transmission is managed via a multipoint polling protocol. In this case, as illustrated in FIG. 11, a short data message is sent prior to transmitting the symbols representing the voice signal. The message identifies the intended sender and recipient, indicates whether or not the channel is active or silent for the duration of time covered by the voice sample block and may also contain information required to reverse any translations done to the voice samples such as the normalization process discussed previously.

Figure 7:
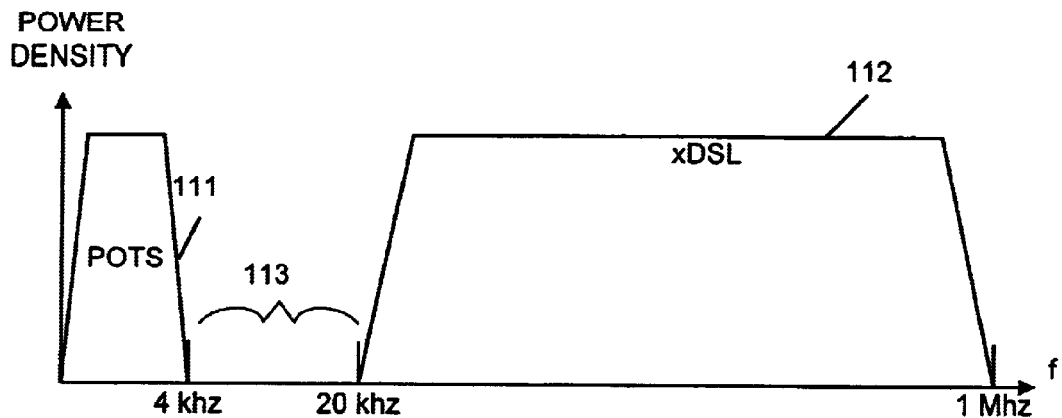
FIG. 7 is a block diagram of a representative frequency spectrum utilized by the modems of FIGS. 3A, 3B, 4 and 5 to transmit the multipoint protocol packets of FIG. 6.

Turning now to the drawings, FIG. 7 is a diagram illustrating various frequency bands used for communications over a digital subscriber line. As is known in the prior art, (POTS communications are transmitted in the frequency band 111 defined between about 0 (DC) and about 4 kHz. A second transmission frequency band 112 is defined at a higher frequency level than the POTS frequency band 111, and is used in the transmission of digital subscriber line (DSL) communications. A guard dead band 113 is typically provided to separate the two transmission frequency bands 111 and 112.

The DSL transmission frequency band 112 is more broadly denominated as "xDSL", wherein the "x" generically denominates any of a number of transmission techniques within the DSL family. For example, ADSL—Asymmetric Digital Subscriber Line, RADSL—Rate Adaptive Digital Subscriber Line, HDSL—High-Bit-Rate DSL, etc. As is known, xDSL transmission frequency bands may encompass a bandwidth of greater than 1 MHz. As a result, and for the reasons described above, without the addition of extra equipment such as POTS filters, splitters, etc. xDSL signals are not compatible with attached POTS type equipment, such as telephones, PSTN modems, facsimile machines, etc.

In accordance with one aspect of the invention, a multi-channel data communication device (modem 50) is provided for achieving efficient data communications between a customer premises 41 and a central office 11 across a local loop 27, by dynamically allocating a transmission frequency bandwidth for transmitting data. Certainly, one of the factors motivating the development of the present invention is the expanded demand for higher speed communications in recent years. This enhanced demand is primarily attributed to communications over the Internet.

Figure 9:
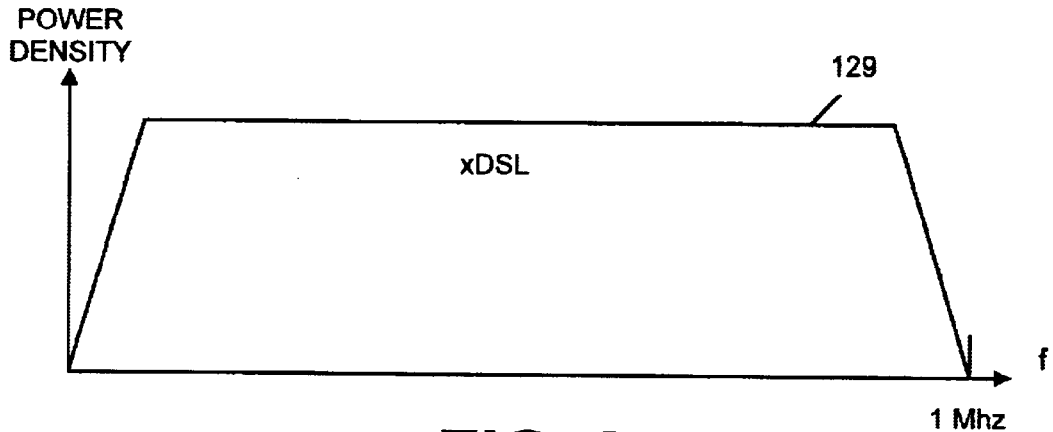
FIG. 9 is a block diagram of a representative Frequency spectrum utilized by the modems of FIGS. 3A, 3B, 4 and 5 to transmit the multipoint protocol packets of FIG. 5, when the frequency band normally utilized by POTS devices is not in currently in use.

The present invention dynamically allocates a data transmission frequency band in response to POTS communications across the same line. More particularly, the present invention may utilize the frequency band otherwise allocated for POTS/voice transmission, at times when there is no present demand for transmitting voice information as illustrated in FIG. 9. When, however, there is a demand for voice transmissions on the POTS line, then the present invention reallocates the transmission frequency band for the data communications so that there is no overlap or interference with the POTS transmission frequency band 111, and so that there is not significant interference to POTS type attached equipment.

Figure 8:
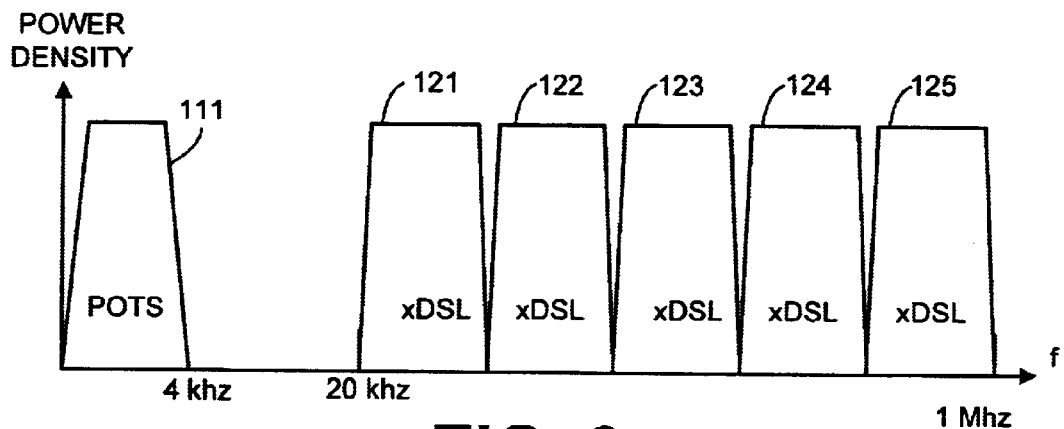
FIG. 8 is a block diagram of a representative frequency spectrum utilized by the frequency division multiplexing method that provides each device with a separately addressable access.

Illustrated in FIG. 8 is the alternative embodiment of the present invention that achieves multiple telephone type services on a single wire pair by utilizing the frequency division multiplexing method. Frequency division multiplexing assigns an available frequency range, within the band with the communication medium, for each device at the customer premises end of a subscriber line that is separately addressable. As shown in FIG. 8, the POTS devices of the prior art telephone 44, standard fax machine 42, and the like, establish communications on a frequency range between 0 kHz and about 4 kHz as shown as item 111. A second transmission frequency range defined at a higher frequency level 161 provides simultaneous multiple access for a telephone type device. Each available frequency range within the bandwidth of the communication medium can be assigned to a particular service type. While FIG. 8 illustrates five frequency ranges 161 through 165, the invention can utilize two or more frequency for example in the range between 20 kHz and 1 MHz.

When frequency division multiplexing is used in conjunction with the current invention each addressable device attached to the subscriber line is assigned one or two different frequency bands. If two bands are assigned, each band is used for transmission of data in a given direction, i.e. upstream or downstream. Within this band, the available transmission time is allocated between blocks of voice samples and blocks of data. Since transmissiontin each direction has exclusive use of the frequency band, there is no need for the overhead of a polling protocol. Time intervals within a periodic frame are assigned to each analog voice device connected to the addressable end point device and the remaining time is used for transmission of data frames.

If frequency division multiplexing is used and a single frequency band is assigned to each addressable end point, since the same bandwidth must be shared by both upsteam and downstream transmissions a polling protocol is appropriate for managing the bandwidth available for data transmission. For managing the transmission of voice signals, either the polling protocol illustrated in FIG. 11 or the time division multiplexing scheme illustrated by FIG. 12 is appropriate.

Figure 10A:
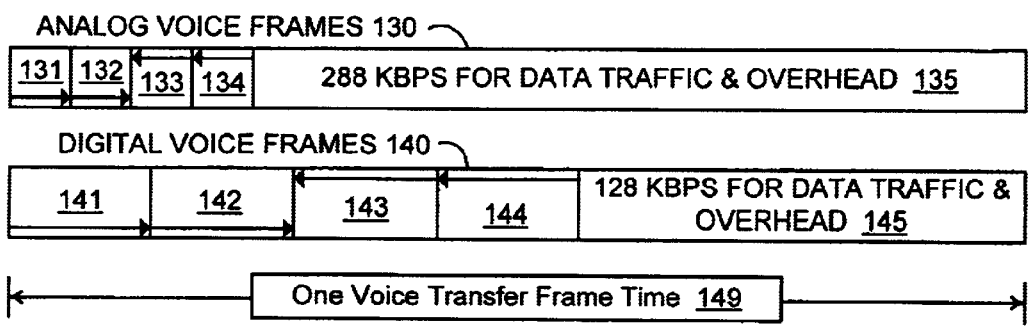
FIGS. 10A through 10C show comparisons of usage of line capacity using the analog method of the present invention versus digital methods of voice transmission for different total line capacities.
Figure 10B:
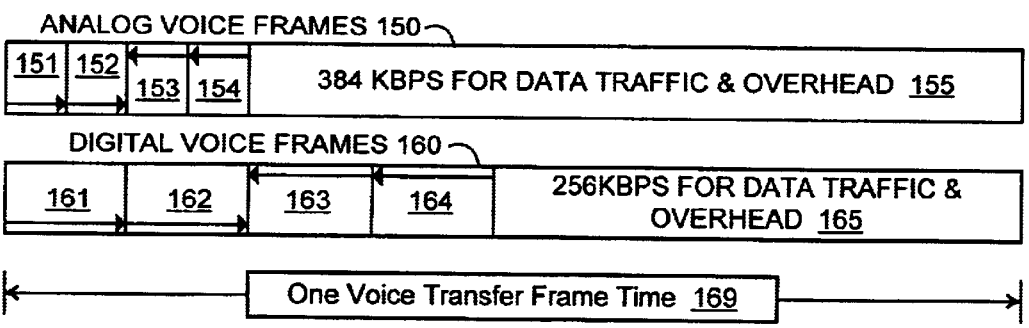
Figure 10C:
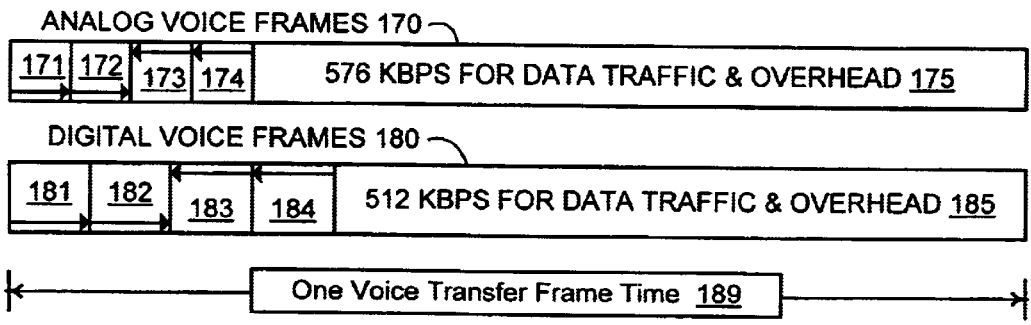

FIGS. 10A–10C show three examples intended to illustrate the benefit of using the technique of the current invention for transmission of analog voice signals across a digital subscriber line as opposed to the more conventional technique. The latter technique simply converts the stream of samples representing the analog signal to a stream of bits and transmits this across the line in the same manner as any digital data stream is transmitter. Typically each voice sample is produced by the analog-to-digital converted at a rate of 8 kHz and is represented in µ-Law or A-law format using 8 bits producing a digital stream of 64 kbps.

In FIGS. 10A–10C it is assumed that a single frequency band is used for both upstream and downstream transmission and that transmission in takes place in only one direction at time (i.e. it is "half duplex"). In FIGS. 10A–10C, it is also assumed that time is broken into equal periodic intervals referred to as voice frames and that, during each of these time periods a block of voice samples is transmitted from each active (i.e. 'off hook') POTS device 43A-X connected to each addressable modem device 50 and, since POTS service normally provides full-duplex communications, one block of voice samples is also transmitted to each active POTS device.

In the examples of FIGS. 10A–10C it is assumed that there are currently two such devices however the example can easily be extended to apply to any number of devices provided there is sufficient bandwidth available to meet the data transmission needs. Finally, for the sake of illustration, in FIGS. 10A–10C it is assumed that the symbol rate of the passband modulation is 64 kHz.

The examples in FIGS. 10A–10C show the portion of the available bandwidth used for voice signal transmission and the resulting amount of bandwidth available for transmission of digital data and overhead with three different values of total available bandwidths equal to 384 kbps, 512 kbps and 768 kbps for FIGS. 10A–10C respectively. For voice transmission using the digital technique, each voice channel requires 64 kbps upstream and 64 kbps downstream for a total bandwidth requirement of 256 kbps for two voice channels.

As shown in FIGS. 10A–10C, the portion of the voice frame time occupied by voice data increases as the available data rate decreases because the same amount of data must be sent during the voice frame time in every case. The remaining bandwidth available for data is just the total available bit rate minus the 256 kbps required for voice or 128 kbps, 256 kbps and 512 kbps for FIGS. 10A–10C respectively.

For voice transmission using the technique of the current invention, two voice samples are always used to form one symbol regardless of the total available bandwidth. Each voice channel therefore always requires 4 k symbols per second to transmit 8 k samples per second in each direction. Therefore, two active voice channels require a total of 16 k symbols per second. However, the relative amount of the available total bit rate available that is consumed for voice signal transmission depends on the number of bits per symbol currently being sent by the modulation. This is equal to the total available bit rate divided by the symbol rate or 6, 8 and 12 bits per symbol respectively for FIGS. 10A,–10C respectively. The bandwidth available for digital data and overhead is then equal to the symbol rate available for digital data times the number of bits per symbol in use. The symbol rate available for digital data and overhead is same in all three cases, namely 64 kHz minus the 16 kHz required for voice. The resulting bandwidths for digital data and overhead are then 288 kbps, 384 kbps and 576 kbps for FIGS. 10A–10C respectively.

In each case in the examples of FIGS. 10A–10C, using the technique of the current invention, more bandwidth is available for voice and overhead. Significantly the benefit is more pronounced as the total available bit rate decreases. There is more bandwidth available for voice and overhead using the technique of the current invention with a total bandwidth of 384 kbps than when using the more conventional technique when the line provides a bandwidth of 512 kbps. Not shown in the examples of FIGS. 10A–10C but also worth noting is the case in which the line is can only provide 192 kbps of total bandwidth. In this case it is not possible to support two voice channels using the conventional approach whereas using the technique of the current invention, two voice channels (albeit possibly at somewhat reduced sound quality) plus 144 kbps for digital data and overhead can be made available.

Figure 11B:
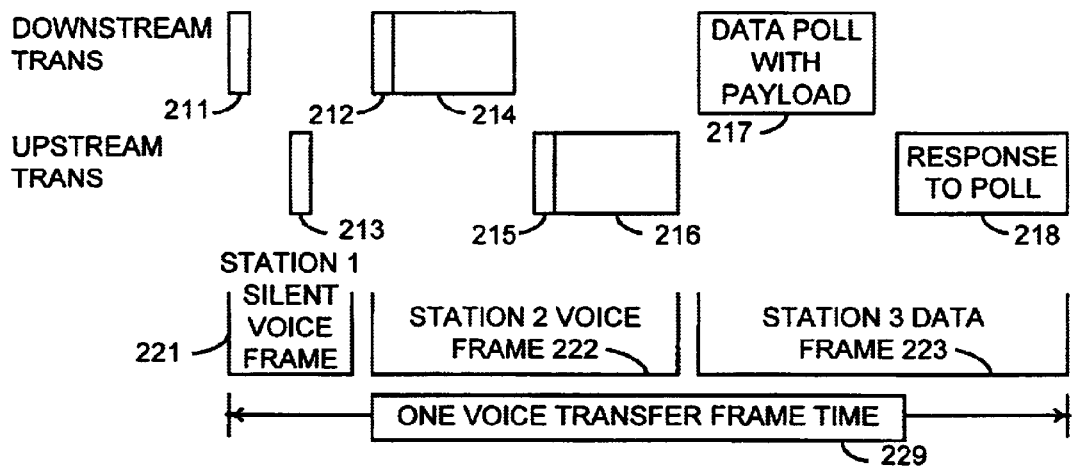
FIG. 11B is a block diagram representative of transmission sequences using a pulling protocol with two voice channels available and with one channel currently silent in both directions.

Referring now to FIGS. 11A and 11B, illustrated is transmission sequences using a Polling Protocol with two voice channels available. In FIG. 11A both voice channels have signal activity. In FIG. 11B only one channel has signal activity. In both cases, transmission on the line is controlled by master modem 14 (FIG. 2). Transmission of blocks of voice samples using the technique of the current invention is represented by blocks 192, 194, 196, 198, 214, 216. Each of these is preceded by a small header transmitted as normal digital data represented by blocks 191, 193, 195, 197, 211, 212, 213, 215. This header identifies the voice channel for which voice samples are being transmitted immediately following the header and whether or not a block of voice samples will be transmitted following the header and optionally, the number of voice samples that will be sent in the following transmission. It may also include other data such as signaling information used for call establishment and data used to reverse signal translations made to improve the signal to noise ratio as discussed previously in connection with FIG. 6.

For downstream transmissions, the header also includes the address of a tributary modem 50 and a poll bit that indicates whether or not the master modem expects this tributary modem to respond by transmitting a block of voice samples immediately after the end of the current transmission is received.

FIG. 11B illustrates a possible sequence when one voice channel is currently silent in both directions. This can be determined at the transmitting end by analyzing a block of voice samples accumulated in a buffer and determining that the signal energy represented by these samples is insufficient to be an actual signal and can be adequately represented by silence. In this case it is not necessary to transmit silence across the line. The receiving end need only be informed that the block contains silence and it can internally generate a block of samples to deliver to the digital-to-analog converter that suitably represents this silence. In case of FIG. 11B, for the first voice channel both the master modem and the polled tributary send only a header indicating that no voice samples are transmitted after the header. The benefit of this, of course, is that more bandwidth is available for transmission of digital data within this voice frame time period.

Referring now to FIG. 12, illustrated is transmission sequences using Time Division Multiplexing for voice signals with two voice channels available, wherein both voice channels have signal activity. In this scheme, time is broken into regularly repeating periods referred to as voice transfer frame times 249.

Each active voice channel is assigned a continuous segment within this time during which to transmit the upstream signal (233, 234) and a second continuous segment to transmit the downstream signal (237, 238). The beginning and ending time of these segments relative to the beginning of the voice transfer frame period are constant. Since the time segments for transmission are fixed, there is no need for a digital header preceding the voice samples. Information needed to reverse the simply normalization process described previously can be transmitted in a non-digital format using a few additional symbols as also described previously. Any time remaining in the voice transfer frame period 249 is available for transmission of digital data (235, 236). As this portion of the frame can potentially be used by any station to transmit digital data, use of this interval is managed by the master modem using a polling protocol as described previously.

The benefit of the time division multiplexing scheme illustrated in FIG. 12 as opposed to the polling scheme illustrated in FIG. 11 is that it has less overall overhead since headers are not transmitted. As a result, in cases where the voice channels carry continuous activity, the scheme of FIG. 12 is likely to be more efficient. Blocks of analog samples are transmitted at exactly the same point in time relative to the periodic frame interval whereas, with the polling scheme, the times of transmission are variable within the frame time. This means that less buffering is required to absorb the variation in delay with the time division multiplexing scheme than is required with the polling scheme resulting in lower overall delay in transmitting the voice signal.

The derived POTS logic 80, which comprises an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (magnetic), a read-only memory (ROM) (magnetic), an erasable programmable read-only memory (EPROM or Flash memory) (magnetic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description has been presented for purposes of illustration and description. It is not intended to be exhaustive or to limit the invention to the precise forms disclosed. Obvious modifications or variations are possible in light of the above teachings. The embodiment or embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

What I claim is:

1. A data communications apparatus for supporting at least one plain old telephone service (POTS) communications device simultaneously, said data communications apparatus comprising:

interface circuitry connectable to a communications link;

a derived POTS interface circuitry connectable to said at least one POTS communications device;

a digital-interface circuitry connectable to a digital device; and a logic circuitry that allows said data communications apparatus to alternately transmit a signal from said at least one POTS communications device and a signal from said digital device, wherein said logic circuitry further comprises:

a converter circuitry for converting each analog signal from said at least one POTS communications device into derived digital signal samples;

at least one buffer memory, wherein said at least one buffer memory receives and stores said derived digital signal samples so that a block of derived digital signal samples for said at least one POTS communications device source signal is available to be sent over said communications link as a burst;

a selector circuitry that selects from one of said at least one buffer memory a block of said derived digital signal samples for formatting;

a multi-dimensional formatting circuitry that receives said block of said derived digital signal samples from said at least one buffer memory and combines at least two of said signal samples into a single multi-dimensional symbol; and a multiplexer that alternately selects blocks of symbols for transmission over said communications link, said multiplexer alternately selecting blocks of symbols from said at least one POTS communications device and said digital device.

2. The apparatus of claim 1, wherein said converter circuitry further comprises:

circuitry to convert each said analog signal to a derived digital signal by sampling the analog signal at a sample rate of 8 kHz to a produce a stream of derived digital signal samples; and wherein said conversion is selected from the group consisting of a linear conversion, Mu conversions or A law conversions.

3. The apparatus of claim 1, wherein said at least one buffer memory further comprises:

circuitry that groups said derived digital signal samples into frames until pairs of derived digital signal samples can be applied to the modulating signal in a burst.

4. The apparatus of claim 1, wherein said selector circuitry further comprises:

circuitry that selects derived digital signal samples from one of said at least one buffer memory in a circular manner.

5. The apparatus of claim 1, wherein said multi-dimensional formatting circuitry further comprises:

circuitry that receives said derived digital signal samples two at a time from said at least one buffer memory and combines at least two of said signal samples into a single two-dimensional symbol with in-phase and quadrature components.

6. The apparatus of claim 1, wherein said multiplexer further comprises:

circuitry for controlling said multiplexer depending on the technique used for managing bandwidth on said communications link.

7. The apparatus of claim 1, further comprises:

translation circuitry for reducing a perceived amount of noise.

8. A method for use in data communications apparatus for supporting at least one plain old telephone service (POTS) communications device simultaneously, the method comprising the steps of:

providing a derived POTS interface circuitry connectable to said at least one POTS communications device;

providing a digital interface circuitry connectable to a digital device;

receiving at least one analog signal from said at least one POTS communications device connected to said data communications apparatus;

converting each analog signal from said at least one POTS communications device into derived digital signal samples;

receiving a block of said derived digital signal samples and combining at least two of said signal samples into a single multi-dimensional symbol; and selecting alternate blocks of symbols for transmission over a communications link, and alternating transmission of said blocks of symbols from said at least one POTS communications device and said digital device.

9. The method of claim 8, comprising the steps of:

storing said derived digital signal samples so that a block of derived digital signal samples for said at least one POTS communications device source signal is available as a burst; and selecting a block of said derived digital signal samples for formatting from one of said at least one buffer memory.

10. The method of claim 9, wherein the step of receiving said block of said derived digital signal samples and combining at least two of said signal samples includes the steps of:

receiving said derived digital signal samples two at a time from said at least one buffer memory; and combining at least two of said signal samples into a single two-dimensional symbol with in-phase and quadrature components.

11. The method of claim 9, wherein the step of selecting alternate blocks of symbols for transmission includes the step of:

controlling said selecting depending on the technique used for managing bandwidth on said communications link.

12. The method of claim 9, further includes the step of:

reducing a perceived amount of noise.

13. The method of claim 8, wherein the step of converting each analog signal includes the steps of:

selecting a converting method from the group consisting of a linear conversion, Mu conversions or A law conversions; and converting each said analog signal to a derived digital signal by sampling the analog signal at a sample rate of 8 kHz to a produce a stream of derived digital signal samples.

14. The method of claim 8, wherein the step of storing said derived digital signal samples includes the steps of:

grouping said derived digital signal samples into frames until pairs of derived digital signal samples can be applied to the modulating signal in a burst.

15. The method of claim 8, wherein the step of selecting a block of said derived digital signal samples for formatting includes the steps of:

selecting derived digital signal samples from one of said at least one buffer memory in a circular manner.

16. Data communications apparatus comprising:

a means for providing a connection to at least one plain old telephone service (POTS) communications device;

a means for providing a connection to a digital device;

a means for receiving at least one analog signal from said at least one POTS communications device connected to said data communications apparatus;

a means for converting each analog signal from said at least one POTS communications device into derived digital signal samples;

a means for receiving a block of said derived digital signal samples and combining at least two of said signal samples into a single multi-dimensional symbol; and a means for selecting alternate blocks of symbols for transmission over a communications link, said selecting means alternating transmission of said blocks of symbols from said at least one of a plurality of analog devices and said digital device.

17. The apparatus of claim 16 further comprising:

a means for storing said derived digital signal samples so that a block of the derived digital signal samples for said at least one POTS communications device source signal is available as a burst; and a means for selecting a block of said derived digital signal samples for formatting from said storing means.

18. The apparatus of claim 16, wherein said converting each analog signal means further comprises:

a means for selecting a converting method from the group consisting of a linear conversion, Mu conversions or A law conversions; and a means for converting each said analog signals to a derived digital signal by sampling the analog signal at a sample rate of 8 kHz to a produce a stream of derived digital signal samples.

19. The apparatus of claim 16, wherein said storing said derived digital signal samples means further comprises:

a means for grouping said derived digital signal samples into frames until pairs of derived digital signal samples can be applied to the modulating signal in a burst.

20. The apparatus of claim 16, wherein said selecting a block of said derived digital signal samples for formatting means further comprises:

a means for selecting derived digital signal samples from said storing said derived digital signal samples means in a circular manner.

21. The apparatus of claim 16, wherein said receiving said block of said derived digital signal samples and combining at least two of said signal samples means further comprises:

a means for receiving said derived digital signal samples two at a time from said at least one buffer memory; and a means for combining at least two of said signal samples into a single two-dimensional symbol with in-phase and quadrature components.

22. The apparatus of claim 16, wherein said selecting alternate blocks of symbols for transmission means further comprises:

a means for controlling said selecting depending on the technique used for managing bandwidth on said communications link.

23. The apparatus of claim 16, further comprising:

a means for reducing a perceived amount of noise.

24. A method for use in data communications apparatus for supporting at least one plain old telephone service (POTS) device simultaneously, the method comprising the steps of:

receiving at least one analog signal from said at least one POTS device connected to said data communications apparatus;

converting each at least one analog signal into a plurality of derived digital signal samples;

receiving a block of said plurality of derived digital signal samples from each at least one POTS device and combining at least two of said plurality of derived data digital samples in said block into a multi-dimensional symbol;

selecting a first block of said multi-dimensional symbols from said at least one POTS device;

receiving a stream of data from a Data Terminal Equipment (DTE) and mapping said stream of data into a plurality of symbols;

selecting a second block of symbols from said plurality of symbols; and transmitting alternately said first block of symbols and said second block of symbols over a communications link.

25. The method of claim 24, further comprising the steps of:

storing said derived digital signal samples so that a block of derived digital signal samples for said at least one POTS communications device source signal is available as a burst; and selecting a block of said derived digital signal samples for formatting from one of said at least one buffer memory.

26. The method of claim 24, wherein the step of converting each analog signal further comprises:

selecting a converting method from the group consisting of a linear conversion, Mu conversions or A law conversions; and converting each said analog signal to a derived digital signal by sampling the analog signal at a sample rate of 8 kHz to a produce a stream of derived digital signal samples.

27. The method of claim 24, wherein the step of storing said derived digital signal samples further comprises:

grouping said derived digital signal samples into frames until pairs of derived digital signal samples can be applied to a modulating signal in a burst.

28. The method of claim 24, wherein the step of selecting a block of said derived digital signal samples for formatting further comprises:

selecting said derived digital signal samples from one of said at least one buffer memory in a circular manner.

29. The method of claim 24, wherein the step of receiving said block of said derived digital signal samples and combining at least two of said signal samples further comprises:

receiving said derived digital signal samples two at a time from said at least one buffer memory; and combining at least two of said signal samples into a single two-dimensional symbol with in-phase and quadrature components.

30. The method of claim 24, wherein the step of selecting alternate blocks of symbols for transmission further comprises:

controlling said selecting depending on the technique used for managing bandwidth on said communications link.

* * * * *

UNITED STATES PATENT AND TRADEMARK OFFICE
CERTIFICATE OF CORRECTION

PATENT NO. : 6,704,324 B1
DATED : March 9, 2004
INVENTOR(S) : Kurt Holmquist

It is certified that error appears in the above-identified patent and that said Letters Patent is hereby corrected as shown below:

Column 6,
Line 25, remove the period "." after the word "standard" at the end of the line.
Line 31, remove the number "20" after the word "data".

Column 7,
Line 24, start a new paragraph beginning "DSP logic 35….".
Line 44, remove the semi-colon ";" after the word "Research".
Line 51, start a new paragraph beginning "Likewise, DSP logic 35…"

Column 8,
Line 62, the sentence starting with "It is contemplated by…" is not a new paragraph.

Column 9,
Line 55, start a new paragraph beginning "Multiplexer 89 selects…..".

Column 14,
Line 62, remove the letter "t" after the word "transmission" and insert a space between the words "transmission" and "in".

Signed and Sealed this

Twenty-fifth Day of May, 2004

JON W. DUDAS
*Acting Director of the United States Patent and Trademark Office*